United States Patent
Dey et al.

(10) Patent No.: US 9,438,741 B2
(45) Date of Patent: Sep. 6, 2016

(54) SPOKEN TAGS FOR TELECOM WEB PLATFORMS IN A SOCIAL NETWORK

(75) Inventors: Kuntal Dey, West Bengal (IN); Anupam Jain, Haryana (IN); Arun Kumar, Noida (IN); Natwar Modani, Haryana (IN); Amit Anil Nanavati, New Delhi (IN); Nitendra Rajput, New Delhi (IN)

(73) Assignee: Nuance Communications, Inc., Burlington, MA (US)

( * ) Notice: Subject to any disclaimer, the term of this patent is extended or adjusted under 35 U.S.C. 154(b) by 625 days.

(21) Appl. No.: 12/570,013

(22) Filed: Sep. 30, 2009

(65) Prior Publication Data

US 2011/0077941 A1    Mar. 31, 2011

(51) Int. Cl.
*H04M 7/00* (2006.01)

(52) U.S. Cl.
CPC ..... *H04M 7/0024* (2013.01); *H04M 2203/655* (2013.01); *H04M 2207/18* (2013.01)

(58) Field of Classification Search
CPC ............... G10L 2015/0636; G10L 2015/226; H04M 2203/655
USPC ............ 704/236, 243, 244, 255, 270, 270.1, 704/275; 707/723, 732; 379/88.01, 88.03
See application file for complete search history.

(56) References Cited

U.S. PATENT DOCUMENTS

| | | | | |
|---|---|---|---|---|
| 5,802,149 A * | 9/1998 | Hanson | ............ | H04M 3/42204 379/213.01 |
| 6,058,239 A * | 5/2000 | Doyle | ............ | 386/200 |
| 6,226,612 B1 * | 5/2001 | Srenger et al. | ............ | 704/256.2 |
| 6,424,946 B1 | 7/2002 | Tritschler et al. | | |
| 6,665,644 B1 * | 12/2003 | Kanevsky | ............ | G10L 17/26 704/246 |
| 6,801,893 B1 * | 10/2004 | Backfried et al. | ............ | 704/257 |
| 7,379,869 B2 | 5/2008 | Kendra | | |
| 7,966,171 B2 * | 6/2011 | Gilbert et al. | ............ | 704/8 |
| 8,027,943 B2 * | 9/2011 | Juan et al. | ............ | 706/45 |
| 8,346,206 B1 * | 1/2013 | Andrus | ............ | H04M 3/42178 340/407.2 |
| 9,075,874 B2 * | 7/2015 | Agarwal | ............ | G06F 17/30755 |
| 9,153,233 B2 * | 10/2015 | Hennecke | ............ | G10L 15/26 |
| 2002/0151334 A1 * | 10/2002 | Sharma | ............ | 455/566 |
| 2005/0114131 A1 * | 5/2005 | Stoimenov et al. | ............ | 704/251 |
| 2006/0215821 A1 * | 9/2006 | Rokusek et al. | ............ | 379/88.01 |
| 2006/0287867 A1 * | 12/2006 | Cheng et al. | ............ | 704/275 |
| 2007/0019793 A1 * | 1/2007 | Cheng | ............ | 379/88.01 |
| 2008/0040428 A1 * | 2/2008 | Wei et al. | ............ | 709/204 |
| 2008/0098313 A1 * | 4/2008 | Pollack | ............ | 715/753 |
| 2009/0030688 A1 | 1/2009 | Cerra et al. | | |
| 2009/0232287 A1 * | 9/2009 | Agarwal et al. | ............ | 379/93.14 |
| 2009/0318083 A1 * | 12/2009 | Holmes | ............ | H04M 1/7253 455/41.2 |
| 2010/0312714 A1 * | 12/2010 | Ourega | ............ | 705/319 |

FOREIGN PATENT DOCUMENTS

| | | |
|---|---|---|
| WO | WO 2005/040966 | 5/2005 |
| WO | WO 2007/005098 | 1/2007 |

* cited by examiner

*Primary Examiner* — Martin Lerner
(74) *Attorney, Agent, or Firm* — Hamilton, Brook, Smith & Reynolds, P.C.

(57) ABSTRACT

Techniques for assigning a spoken tag in a telecom web platform are provided. The techniques include receiving a spoken tag, comparing the spoken tag to a set of one or more template tags, if the spoken tag is a match to a template tag, assigning the spoken tag and updating frequency of the tag in the set of one or more template tags, and if the spoken tag is not a match to a template tag, assigning the spoken tag and registering the spoken tag as a new tag in the set of one or more template tags.

16 Claims, 2 Drawing Sheets

SPOKEN TAGS FOR TELECOM WEB PLATFORMS IN A SOCIAL NETWORK

FIELD OF THE INVENTION

Embodiments of the invention generally relate to information technology, and, more particularly, to spoken tags.

BACKGROUND OF THE INVENTION

Tagging has become a very popular way of characterizing a person on the Internet (and intranets), especially within the context of social networks. The tags can be used, for example, for searching, and are generally less expensive than trying to find labels automatically or in a centralized fashion. Also, in some cases, labeling is not even possible (when no attributes can be associated with people).

Existing approaches can include recording tags and playing them back upon request. However, such approaches are cumbersome to retrieve and/or hear, and cannot be used to search. Existing approaches can also include defining a set of tags, however, with such approaches, the user's ability to define tags is compromised.

SUMMARY OF THE INVENTION

Principles and embodiments of the invention provide techniques for enabling spoken tags. An exemplary method (which may be computer-implemented) for assigning a spoken tag in a telecom web platform, according to one aspect of the invention, can include steps of receiving a spoken tag, comparing the spoken tag to a set of one or more template tags, if the spoken tag is a match to a template tag, assigning the spoken tag and updating frequency of the tag in the set of one or more template tags, and if the spoken tag is not a match to a template tag, assigning the spoken tag and registering the spoken tag as a new tag in the set of one or more template tags.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
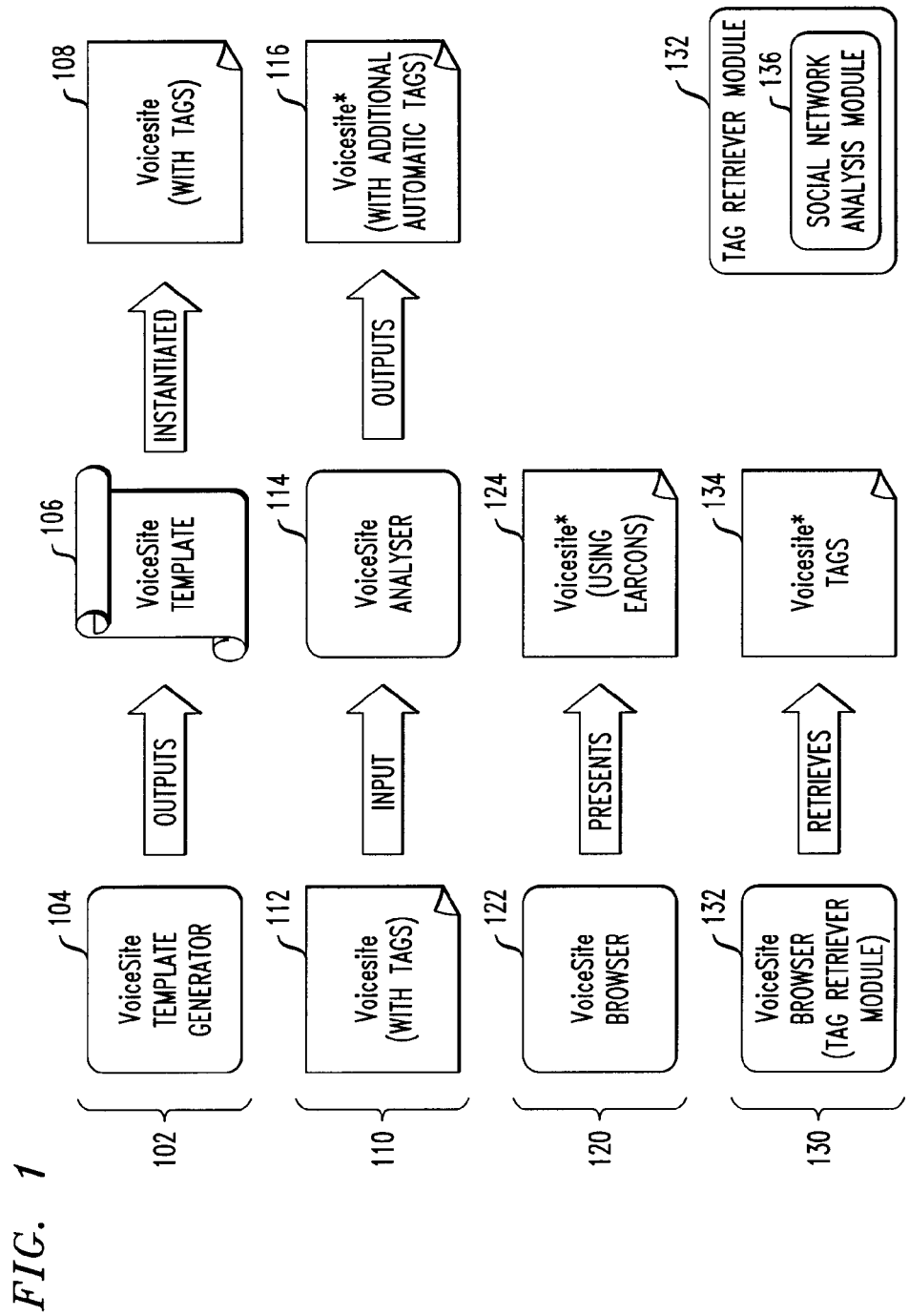
FIG. 1 is a block diagram illustrating one or more embodiments of the invention, according to an aspect of the invention.

Principles of the invention include enabling spoken tags on the telecom web. Telecom web is becoming a powerful means to provide information on mobile devices, and one or more embodiments of the invention include providing tagging capabilities on a telecom web platform, which can, for example, facilitate searching for certain types of personnel and/or content as well as be used for trust and/or reputation management.

Existing approaches do not provide spoken tags, and because speech recognition over a telephone line is not reliable for a large vocabulary size, free form tags cannot be utilized meaningfully on a telecom web platform. As such, the techniques detailed herein include providing a mix model for speech recognition and expressive tags. One or more embodiments of the invention also provide filtering capability based on an underlying implicit social network.

Also, one or more embodiments of the invention include assigning voice tags to persons in a telecom web platform. A user's voice tag can be matched with a set of possible templates, and if a match is found then the frequency of the tag is updated. If there is no match, then a search is conducted for the nearest match, and if it is close enough then its frequency of the tag is updated with user confirmation. If none of the existing tags match, or are not close enough, then the tag is registered as a new tag. Also, each of the tags (old and new) can be stored for future use.

Additionally, in one or more embodiments of the invention, voice tags enable automatic filtering and querying for persons, based on personality, age, rural/urban, etc. in the telecom web with defined features (for example, location, age, personality, etc.). Also, ear cons (that is, short audio segments) can be generated to signify voice tags.

One or more embodiments of the invention enable the template (and/or voice site) owner to choose a set of possible tags with a reasonably-sized vocabulary. As detailed above, when a person attempts to assign a tag to a voice site (which, in turn, may point to a person), one or more embodiments of the invention attempt to match the tag to a set of possible tags.

Additionally, as described herein, one or more embodiments of the invention include filtering based on a social network. Voice tags can be retrieved based on the social network of the querying person. By way of example, a user can be shown only the tags from the people the user knows. Also, such information about the people the user knows can already be present in the system, precluding the need for the user to specify that.

Automatic tagging, as detailed in one or more embodiments of the invention, can include automatically extracting emotion, personality, age group, etc. from a user voice and providing tags that represent these things in the VoiceSite. Also, location (such as, for example, rural, urban, etc.) can be extracted based on the background noise of the VoiceSite recording.

One or more embodiments of the invention can also include representing tags through earcons (that is, sounds such as, for example, a short audio segment). By way of example, earcons can be used as a mechanism to display (play) the tags. Specific earcons can be created to signify a particular tag. For example, an earcon with the sound of traffic can signify an urban tag.

Additionally, telecom web allows site administrators (or their delegates) to create templates that help end users create their voice sites quickly. Further, while the content is provided by the end user, the site administrator can have an idea of voice site composition.

FIG. 1 is a block diagram illustrating an exemplary embodiment, according to an aspect of the invention. By way of illustration, FIG. 1 depicts processes 102, 110, 120 and 130 of one or more embodiments of the invention. Process 102 includes a VoiceSite template generator module 104 providing an output in the form of a VoiceSite template 106, which becomes instantiated as a VoiceSite 108 with tags. Process 110 includes a VoiceSite 112 with tags being input to a VoiceSite analyzer module 114, which outputs a VoiceSite 116 with additional automatic tags. Process 120 includes a VoiceSite browser module 122 presenting a VoiceSite 124 using earcons, and process 130 includes a tag retriever module 132 retrieving VoiceSite tags 134. Additionally, a tag retriever module 132 can include a social network analysis module 136 for tag filtering.

As depicted in FIG. 1, one or more embodiments of the invention include a mix model for speech recognition and more expressive tags. Further, process 102 can additionally include a VoiceSite template that has a list of tags that can be chosen for tagging a VoiceSite that is built from that template. Process 110 can also include automatically adding additional attributes such as, for example, personality, rural, urban taggers, etc. to the VoiceSite. As depicted via process 120, presenting a tag can be performed based on earcons. Additionally, as depicted via process 130, retrieving a tag can be performed by filtering capability based on social network.

Figure 2:
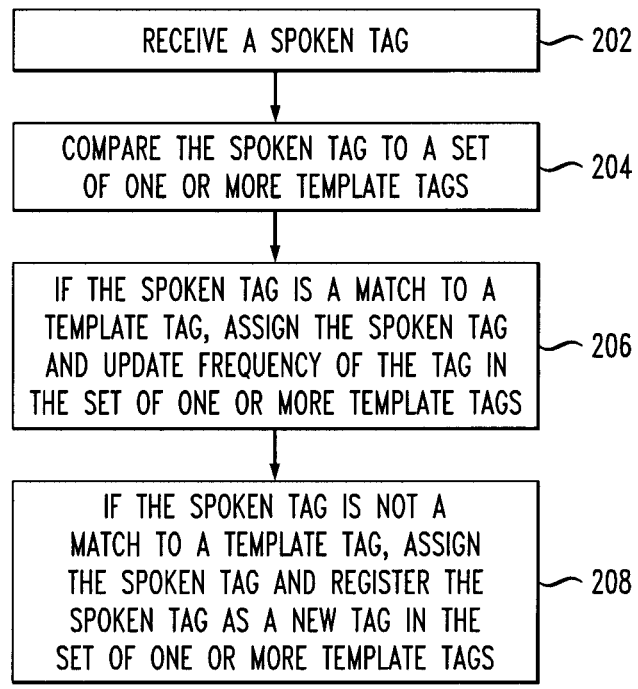
FIG. 2 is a flow diagram illustrating techniques for assigning a spoken tag in a telecom web platform, according to an embodiment of the invention.

FIG. 2 is a flow diagram illustrating techniques for assigning a spoken tag in a telecom web platform, according to an embodiment of the present invention. Step 202 includes receiving a spoken tag (for example, from a user and/or using any voice-based access mechanism). Step 204 includes comparing the spoken tag to a set of one or more template tags. Comparing the spoken tag to a set of template tags can include, for example, creating the set of template tags and/or using a pre-existing set of template tags.

Step 206 includes if the spoken tag is a match to a template tag, assigning the spoken tag (for example, to a person) and updating frequency of the tag in the set of one or more template tags. Step 208 includes if the spoken tag is not a match to a template tag, assigning the spoken tag (for example, to a person) and registering the spoken tag as a new tag in the set of one or more template tags. Also, one or more embodiments of the invention include performing pattern matching-based tag recognition if the spoken tag is not a match to a template tag.

The techniques depicted in FIG. 2 also include searching for a nearest match if no match exists, and if the nearest match is within a pre-determined proximity threshold, assigning the spoken tag and updating frequency of the tag in the set of template tags (for example, with user confirmation). One or more embodiments of the invention can additionally include creating an earcon to signify a spoken tag, as well as automatically determining a spoken tag based on voice content. Automatically determining a spoken tag based on voice content can include using a speech recognition system (as opposed to a speech processing system) to automatically convert speech to text to determine the tag.

Further, the techniques depicted in FIG. 2 can include automatically filtering based on a social network, wherein filtering includes retrieving one or more tags based on the social network of a querying user. By way of example, retrieving tags based on the social network of a querying user can include retrieving only tags from people known to the querying user within the social network and/or retrieving tags based on one or more attributes (for example, personality, age, location, school affiliation, interests, profession, professional affiliation and travel propensity, etc.) of other users in the social network.

The techniques depicted in FIG. 2 can also, as described herein, include providing a system, wherein the system includes distinct software modules, each of the distinct software modules being embodied on a tangible computer-readable recordable storage medium. The distinct software modules can include, for example, a VoiceSite template generator module, a VoiceSite analyzer module, a VoiceSite browser module, a tag retriever module and a social network analysis module executing on a hardware processor.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 3:
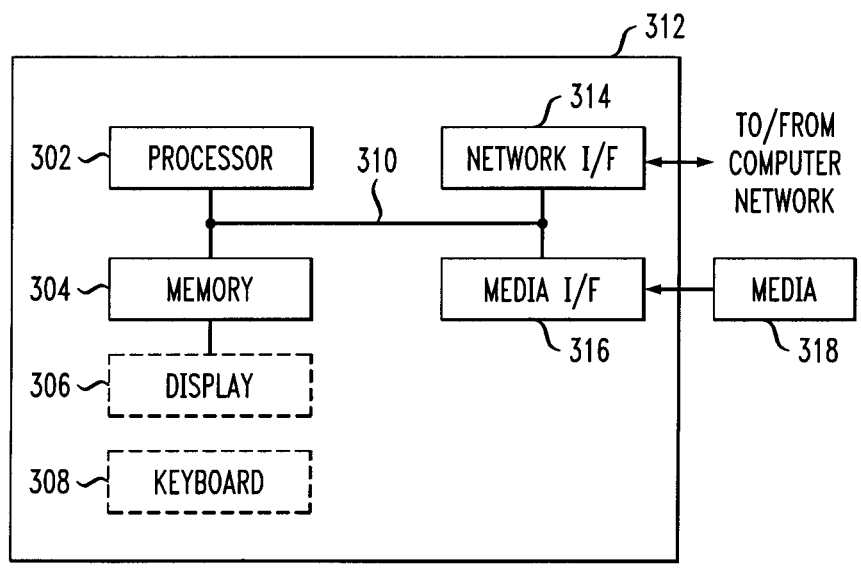
FIG. 3 is a system diagram of an exemplary computer system on which at least one embodiment of the invention can be implemented.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on one or more hardware processors 302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, enabling a template and/or voice site owner to choose a set of possible tags with a reasonable size vocabulary.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for assigning a spoken tag in a telecom web platform, wherein the method comprises:
    receiving a spoken tag from a querying user;
    comparing the spoken tag to a set of one or more template tags, said comparing carried out by a distinct software module executing on a hardware processor;
    if the spoken tag is a match to a template tag, assigning the spoken tag and updating frequency of the spoken tag in the set of one or more template tags, said assigning carried out by a distinct software module executing on a hardware processor;
    if the spoken tag is not a match to a template tag, searching for a nearest match, and if the nearest match is within a pre-determined proximity threshold, assigning the spoken tag and updating frequency of the spoken tag in the set of one or more template tags with user confirmation, said assigning carried out by a distinct software module executing on a hardware processor;
    if the spoken tag is not a match to a template tag and if the nearest match is not within the pre-determined proximity threshold, assigning the spoken tag and registering the spoken tag as a new tag, said assigning carried out by a distinct software module executing on a hardware processor; and
    extracting one or more user attributes from the spoken tag and assigning one or more additional tags associated with the user's location, based on background noise in the spoken tag;
    wherein at least one of the foregoing operations is carried out by a computer device.

2. The method of claim 1, further comprising performing pattern matching-based tag recognition if the spoken tag is not a match to a template tag.

3. The method of claim 1, wherein assigning a spoken tag in a telecom web platform comprises assigning a spoken tag to a person.

4. The method of claim 1, wherein receiving a spoken tag comprises receiving a spoken tag from a user.

5. The method of claim 1, further comprising filtering based on a social network, the filtering comprising retrieving one or more tags based on the social network of a querying user comprises retrieving only tags from one or more people known to the querying user within the social network.

6. The method of claim 1, further comprising filtering based on a social network, the filtering comprising retrieving one or more tags based on the social network of a querying user comprises retrieving one or more tags based on one or more attributes of other users in the social network.

7. The method of claim 6, wherein the one or more attributes comprise at least one of personality, age, location, school affiliation, interests, profession, professional affiliation and travel propensity.

8. The method of claim 1, further comprising generating an earcon to represent a spoken tag, the earcon being a short audio segment.

9. The method of claim 1, further comprising automatically determining a spoken tag based on voice content.

10. The method of claim 9, wherein automatically determining a spoken tag based on voice content comprises using a speech recognition system to automatically convert speech to text to determine the tag.

11. The method of claim 1, wherein comparing the spoken tag to a set of one or more template tags comprises at least one of creating the set of one or more template tags and using a pre-existing set of one or more template tags.

12. The method of claim 1, further comprising providing a system, wherein the system comprises one or more distinct software modules, each of the one or more distinct software modules being embodied on a tangible computer-readable recordable storage medium, and wherein the one or more distinct software modules comprise a template generator module, a analyzer module, a browser module, a tag retriever module and a social network analysis module executing on a hardware processor.

13. A non-transitory computer program product comprising a tangible computer readable recordable storage medium including computer useable program code for assigning a spoken tag in a telecom web platform, the computer program product including:
- computer useable program code for receiving a spoken tag from a querying user;
- computer useable program code for comparing the spoken tag to a set of one or more template tags;
- computer useable program code for assigning the spoken tag and updating frequency of the spoken tag in the set of one or more template tags if the spoken tag is a match to a template tag;
- computer useable program code for searching for a nearest match, and if the nearest match is within a pre-determined proximity threshold, assigning the spoken tag and updating frequency of the spoken tag in the set of one or more template tags with user confirmation if the spoken tag is not a match to a template tag;
- computer useable program code for assigning the spoken tag and registering the spoken tag as a new tag if the spoken tag is not a match to a template tag and if the nearest match is not within the pre-determined proximity threshold; and
- computer useable program code for extracting one or more user attributes from the spoken tag and assigning one or more additional tags associated with the user's location, based on background noise in the spoken tag.

14. The non-transitory computer program product of claim 13, wherein the computer useable program code comprises one or more distinct software modules, and wherein the one or more distinct software modules comprise a template generator module, an analyzer module, a browser module, a tag retriever module and a social network analysis module executing on a hardware processor.

15. A system for assigning a spoken tag in a telecom web platform, comprising:
- a memory; and
- at least one processor coupled to the memory and operative to:
- receive a spoken tag from a querying user;
- compare the spoken tag to a set of one or more template tags;
- assign the spoken tag and update frequency of the spoken tag in the set of one or more template tags if the spoken tag is a match to a template tag;
- search for a nearest match, and if the nearest match is within a pre-determined proximity threshold, assign the spoken tag and update frequency of the spoken tag in the set of one or more template tags with user confirmation if the spoken tag is not a match to a template tag;
- assign the spoken tag and register the spoken tag as a new tag if the spoken tag is not a match to a template tag and if the nearest match is not within the pre-determined proximity threshold; and
- extract one or more user attributes from the spoken tag and assigning one or more additional tags associated with the user's location, based on background noise in the spoken tag.

16. The system of claim 15, further comprising a tangible computer-readable recordable storage medium having one or more distinct software modules embodied thereon, the one or more distinct software modules comprising a template generator module, an analyzer module, a browser module, a tag retriever module and a social network analysis module executing on a hardware processor.

* * * * *